(12) United States Patent
Charles et al.

(10) Patent No.: US 11,105,178 B2
(45) Date of Patent: Aug. 31, 2021

(54) SUBSEA SLIP-ON PIPELINE REPAIR CONNECTOR WITH GRAPHITE PACKING

(71) Applicant: Oceaneering International, Inc., Houston, TX (US)

(72) Inventors: Matthew Charles, Houston, TX (US); Chen Cheng, Houston, TX (US); Prashant Kamdar, Cypress, TX (US)

(73) Assignee: Oceaneering International, Inc., Houston, TX (US)

( * ) Notice: Subject to any disclaimer, the term of this patent is extended or adjusted under 35 U.S.C. 154(b) by 68 days.

(21) Appl. No.: 16/721,584

(22) Filed: Dec. 19, 2019

(65) Prior Publication Data

US 2020/0141529 A1     May 7, 2020

Related U.S. Application Data

(63) Continuation-in-part of application No. 15/097,463, filed on Apr. 13, 2016, now Pat. No. 10,753,170.

(60) Provisional application No. 62/782,121, filed on Dec. 19, 2018.

(51) Int. Cl.
| | |
|---|---|
| *E21B 33/12* | (2006.01) |
| *F16L 55/18* | (2006.01) |
| *F16L 55/17* | (2006.01) |
| *F16J 15/16* | (2006.01) |
| *E21B 43/10* | (2006.01) |

(52) U.S. Cl.
CPC ...... *E21B 33/1216* (2013.01); *E21B 33/1208* (2013.01); *F16J 15/166* (2013.01); *F16L 55/17* (2013.01); *F16L 55/18* (2013.01); *E21B 43/105* (2013.01); *E21B 2200/01* (2020.05)

(58) Field of Classification Search
CPC .... E21B 33/005; E21B 33/10; E21B 33/1208; E21B 33/1212; E21B 33/1216; E21B 2200/01; E21B 43/105; F16J 15/121; F16J 15/166; F16L 55/17; F16L 55/18
USPC ........................................................ 277/342
See application file for complete search history.

(56) References Cited

U.S. PATENT DOCUMENTS

| | | | | |
|---|---|---|---|---|
| 3,068,942 A | * | 12/1962 | Brown .................... | E21B 33/12 277/342 |
| 3,215,205 A | * | 11/1965 | Sizer .................... | E21B 33/1295 166/120 |
| 3,371,716 A | * | 3/1968 | Current .............. | E21B 33/1216 166/118 |
| 3,517,742 A | * | 6/1970 | Williams ............ | E21B 33/1216 277/338 |
| 3,554,280 A | * | 1/1971 | Tucker ................. | E21B 33/128 166/134 |
| 3,666,010 A | * | 5/1972 | Harris ................... | E21B 33/128 166/134 |
| 4,433,847 A | * | 2/1984 | Weinberg ............ | E21B 33/1208 277/342 |

(Continued)

*Primary Examiner* — Nicholas L Foster
(74) *Attorney, Agent, or Firm* — Maze IP Law, P.C.

(57) ABSTRACT

A tubular connection system comprises a slip sized to fit about an outer diameter of a tubular, one or more pipeline connectors sized to fit within a tubular housing and comprising a graphite packer and a set of slip limiting rings disposed on either the first side or the second side of the graphite packer against the graphite packer's first C-shaped ring or the second C-shaped ring, and a connector activator operatively in communication with the tubular housing and operative to compress or decompress the first graphite packer.

18 Claims, 6 Drawing Sheets

(56) References Cited

U.S. PATENT DOCUMENTS

| | | | | |
|---|---|---|---|---|
| 4,468,042 A * | 8/1984 | Pippert | ............. | F16J 15/166 |
| | | | | 277/638 |
| 4,548,265 A * | 10/1985 | Luke | ............. | E21B 33/1208 |
| | | | | 166/140 |
| 4,730,835 A * | 3/1988 | Wilcox | ............. | F16J 15/166 |
| | | | | 166/120 |
| 4,765,404 A * | 8/1988 | Bailey | ............. | E21B 33/1216 |
| | | | | 166/117.6 |
| 6,948,715 B2 * | 9/2005 | Taylor | ............. | F16J 15/164 |
| | | | | 277/331 |
| 7,360,590 B2 * | 4/2008 | Kossa | ............. | E21B 33/1208 |
| | | | | 166/119 |
| 7,708,080 B2 * | 5/2010 | Conaway | ............. | E21B 33/1216 |
| | | | | 166/387 |
| 8,201,832 B2 * | 6/2012 | Kocurek | ............. | F16J 15/104 |
| | | | | 277/603 |
| 8,800,648 B2 * | 8/2014 | Kocurek | ............. | F16J 15/024 |
| | | | | 166/179 |
| 9,109,428 B2 * | 8/2015 | Frazier | ............. | E21B 34/063 |
| 9,127,527 B2 * | 9/2015 | Frazier | ............. | E21B 33/129 |
| 9,163,477 B2 * | 10/2015 | Frazier | ............. | E21B 33/134 |
| 9,458,691 B2 * | 10/2016 | Rowe | ............. | E21B 33/1212 |
| 9,617,818 B2 * | 4/2017 | Kocurek | ............. | F16L 21/03 |
| 9,835,252 B2 * | 12/2017 | Kocurek | ............. | F16J 15/104 |
| 9,863,536 B2 * | 1/2018 | Cheng | ............. | F16J 15/3284 |
| 10,001,216 B2 * | 6/2018 | Puccio | ............. | F16J 15/128 |
| 2003/0209857 A1 * | 11/2003 | Keene | ............. | F16J 15/128 |
| | | | | 277/336 |
| 2003/0209862 A1 * | 11/2003 | Keene | ............. | E21B 33/1212 |
| | | | | 277/607 |
| 2004/0017047 A1 * | 1/2004 | Taylor | ............. | F16J 15/164 |
| | | | | 277/434 |
| 2008/0136122 A1 * | 6/2008 | Gambier | ............. | E21B 33/038 |
| | | | | 277/650 |
| 2010/0194049 A1 * | 8/2010 | Kocurek | ............. | E21B 33/03 |
| | | | | 277/314 |
| 2011/0240295 A1 * | 10/2011 | Porter | ............. | E21B 33/12 |
| | | | | 166/308.1 |
| 2011/0259610 A1 * | 10/2011 | Shkurti | ............. | E21B 33/12 |
| | | | | 166/386 |
| 2011/0266752 A1 * | 11/2011 | Kocurek | ............. | F16J 15/024 |
| | | | | 277/322 |
| 2012/0248703 A1 * | 10/2012 | Kocurek | ............. | F16J 15/104 |
| | | | | 277/343 |
| 2014/0124193 A1 * | 5/2014 | Rowe | ............. | E21B 33/1212 |
| | | | | 166/115 |
| 2014/0203516 A1 * | 7/2014 | Kocurek | ............. | F16J 15/166 |
| | | | | 277/399 |

* cited by examiner

SUBSEA SLIP-ON PIPELINE REPAIR CONNECTOR WITH GRAPHITE PACKING

RELATION TO PRIOR APPLICATIONS

This continuation-in-part application claims the benefit of, and priority through, U.S. application Ser. No. 15/097,463 titled "Capping Stack Hydraulic Slip-On Connector Seal Assembly," filed Apr. 13, 2016, which claimed the benefit of, and priority through, Provisional Application 62/146,698, titled "Capping Stack Hydraulic Slip-On Connector Seal Assembly," filed Apr. 13, 2015, and further claims the benefit of, and priority through, through U.S. Provisional Application 62/782,121, titled "SUBSEA SLIP-ON PIPELINE REPAIR CONNECTOR WITH GRAPHITE PACKING," filed on Dec. 19, 2018.

BACKGROUND

Sealing performance is critical for success in certain subsea operations, including cap and contain deepwater well control. Current seals require that a specific seal be used for a series of sizes or, alternatively, to use multiple seals as opposed to a single stack.

Current subsea pipeline repair connector technology has relied on an elastomeric sealing element to form a leak tight seal on an in-situ pipeline. The elastomeric seal is generally used in a packer arrangement whereby the seal is compressed within the connector, either mechanically or hydraulically, to allow the seal to conform to the pipeline's outer diameter and form a seal.

Elastomeric seals have been used in pipeline repair connectors mainly due to their ability to form an effective seal and to easily flow into large gaps under compression. This enables the subsea pipeline connector to seal on pipelines with imperfect surface finishes and to accommodate sealing on an in-situ pipeline which for any one nominal pipe size can have varying outer diameters and ovalities. Moreover, elastomeric seals come in many different varieties to suit a particular application. However, these elastomeric seals generally have limitations with regards to temperature range and ability to maintain a seal under thermal cycling.

Graphite seals have many of the benefits of some of the premium elastomeric seals such as wide range of chemical compatibility, no susceptibility to explosive decompression and very little creep with the added advantage of a wider temperature range and better stability in thermal cycling applications. Certain applications within the subsea pipeline repair industry are better suited to a graphite seal than an elastomeric seal. Although graphite seals are commonly used as a sealing element in a variety of applications, use of such seals in subsea pipeline connectors is limited with existing technology requiring substantial preparation of pipeline to enable it to seal due to inability of current graphite seal setup to overcome surface imperfections and accommodate the various combinations of ovality and outer diameters within a given nominal pipe size.

FIGURES

Various figures are included herein which illustrate aspects of embodiments of the disclosed invention.

DESCRIPTION OF EXEMPLARY EMBODIMENTS

Generally, compared to technology currently existing for pipeline slip-on connectors, the ability of the claimed invention to better overcome the surface imperfections of the pipeline and accommodate the various combinations of ovality and outer diameters within a given nominal pipe size is due to the material composition of seal ≥ that 98% carbon which takes advantage of graphite's natural ability to flow under compression, increased volume of seal material within a given packer to accommodate being crushed over large gaps while covering and filling surface imperfections, and effective control of the extrusion gap that is created when designing a one size connector intended to seal along the range and ovality of a given nominal pipeline while at the same time allowing clearance to install the connector over pipeline in unset condition.

In general, graphite seals have different properties than elastomers in terms of how much compression is needed to achieve a desired seal. The invention described herein allows subsea repair connectors for current technology that were originally designed for elastomer packers to be retrofitted with graphite packers with minimal modification. Current art uses a narrow metal graphite composite seal which requires a pipe to be machined to achieve required outer diameter and surface finish prior to install on a tubular such as a pipeline.

In embodiments, the claimed invention allows pipeline repair connectors to retain many of the beneficial characteristics of some of the more premium elastomers with the added advantage of a wider temperature range and increased suitability for applications requiring thermal cycling. This will make the invention appropriate for use in flowline/riser repair such as where thermal cycling and high temperatures are almost always a requirement.

Generally, as described below composite circular connector seals 1 (FIG. 1) are typically engineered to seal across a predetermined tolerance band for seals such as one specified for a 2018 API Spec 5CT casing, i.e. +1% to −0.5% on the outside diameter. This can help avoid the need and cost of maintaining an inventory of multiple seal packs for example, one for the high side of the casing tolerance and another for the low side and also the operational complexity of having to install the appropriate seal pack in the field. In embodiments, the invention comprises using a graphite seal in a packing configuration within one or more subsea slip-on pipeline repair connectors in a manner that requires minimal to no preparation of pipeline outer diameter. The graphite packer can be used alongside a piston that is either hydraulically or mechanically actuated and can work in systems comprising one or more pipeline repair connectors.

Figure 1:
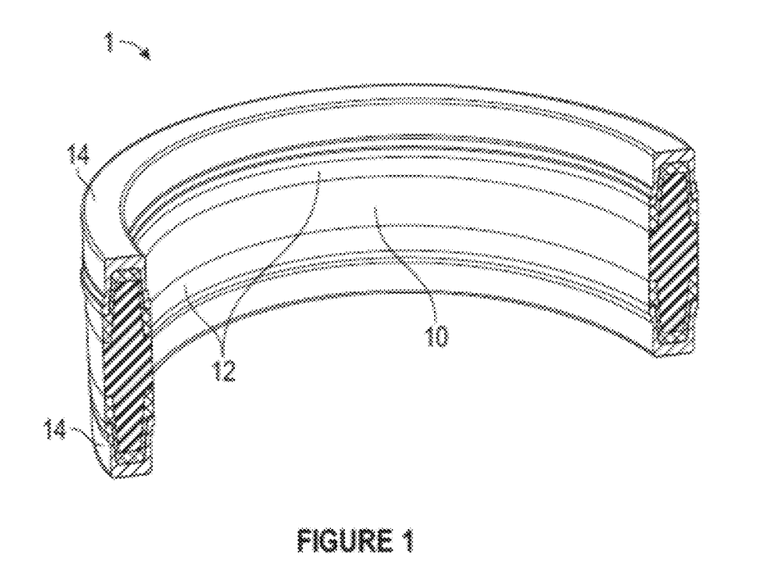
FIG. 1 is a cutaway view in partial perspective of an exemplary seal.
Figure 2:
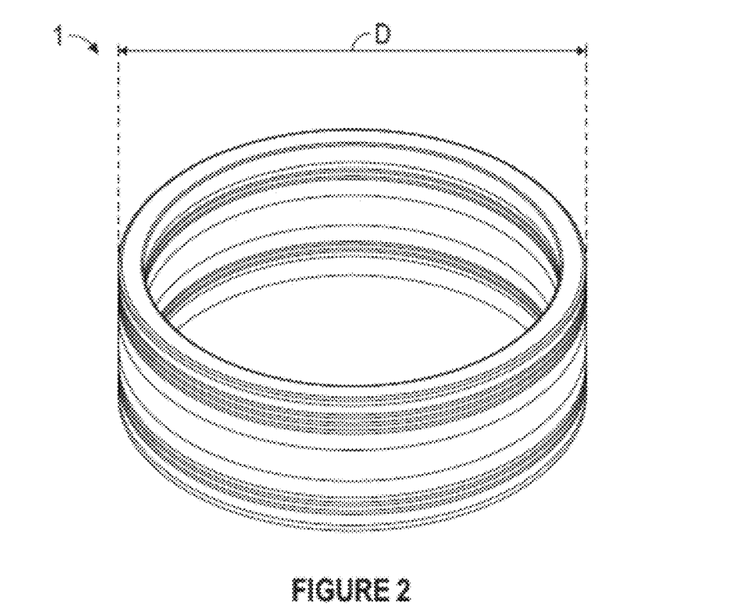
FIG. 2 is a view in partial perspective of an exemplary seal.
Figure 3:
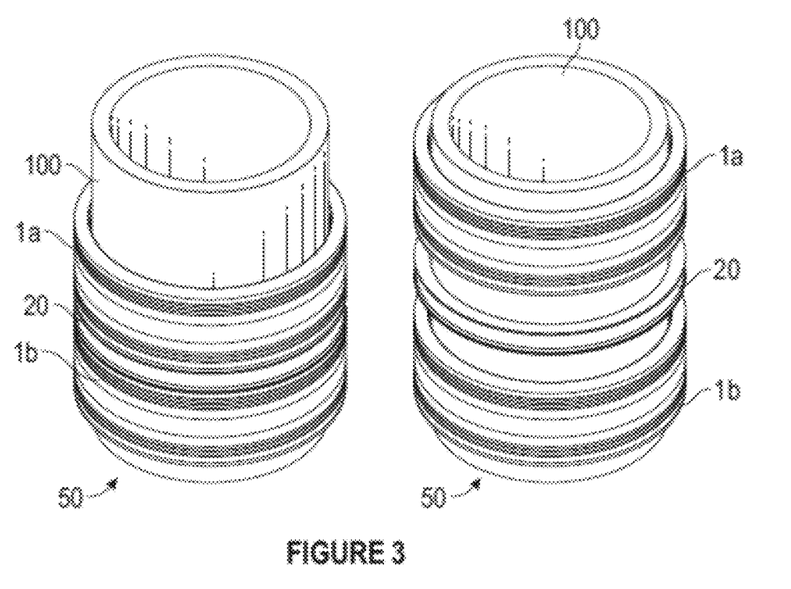
FIG. 3 are two views in partial perspective of an exemplary seal assembly.

Referring now to FIG. 1, in a first embodiment composite circular connector seal 1 defines a fully circumferential composite seal and is configured to lock and seal over tubular 100 (FIG. 3). Composite circular connector seal 1 comprises an outer diameter "D" (FIG. 2) sized to slidingly fit about tubular 100, where tubular 100 comprises a positive and negative outer diameter tolerance range. As used herein, a "tubular" may be a riser, a vertical flow casing, a conduit, or the like, most typically for subsea use.

Composite circular connector seal 1 comprises a composite stack which comprises two substantially circular seal elements 12 and a substantially circular core seal element 10 disposed intermediate to, typically molded to, the two seal elements 12. Each seal element 12 is typically configured to seal about tubular 100 to a predetermined sealing percentage and is typically used as a primary seal anti-extrusion mechanism.

In certain embodiments, each seal element 12 comprises an organic thermoplastic polymer and each is terminated at the non-molded circumferential edge with packer cap 14, which, in preferred embodiments, comprises packer caps comprising Inconel and which may further comprise a fixed diameter. The organic thermoplastic polymer may comprise a polyether ether ketone PEEK which, as core seal element 10 is compressed, moves into seal gap 103 (FIG. 4) to create a barrier to contain core seal element 10 material.

Figure 4:
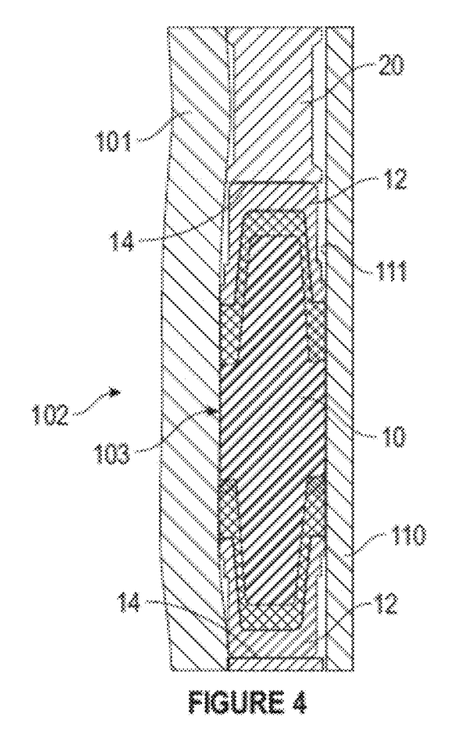
FIG. 4 is a cutaway view in partial perspective of an exemplary seal deployed in a housing.

Referring additionally to FIG. 4, core seal element 10 typically comprises a synthetic rubber, such as nitrile rubber NBR. Typically, as the two seal elements 12 are compressed, the organic thermoplastic polymer, e.g., PEEK, moves into seal gap 103 to create a barrier to contain core seal element 10. As further illustrated in FIG. 4, core seal element 10 is typically configured such that under longitudinal compressive load of composite circular connector seal 1 (FIG. 1) core seal element 10 flows into seal gap 103 between outside 101 of tubular 100 and an inside 111 of housing 110 to create a positive seal. As used herein, a housing can be another tubular, a wellbore, or another structure, or the like. By way of example and not limitation, this positive seal may be a positive seal on an API 5CT casing across a range of minimum and maximum outer diameter tolerances for tubular 100. In certain embodiments, composite circular connector seal 1 is configured to create a positive seal load maintained on tubular 100 equal to or greater than 1.2 times the maximum allowable operating pressure MAOP of tubular 100. As also illustrated in FIG. 4, the volume of core seal element 10 may remain constant but its shape may alter to match the volume fill during sealing.

In its various embodiments, the flow of both the core seal element 10 material and the seal element 12 material move the inner and outer diameters of packer cap 14 to the limit of seal gap 103, creating a near metal-to-metal seal on the front and back of the core seal element 10 material and the seal element 12 material. In most embodiments, this prevents extrusive flow of either the core seal element 10 material or the seal element 12 material from either end of composite circular connector seal 12 during full compressive load and operating pressure in tubular 10.

Referring now to FIG. 3, in an embodiment slip-on connector seal assembly 50 comprises two composite circular connector seals 1, e.g. first composite circular connector seal 1a and second composite circular connector seal 1b, and metal ring 20, sometimes referred to as a Lantern Ring, disposed intermediate first composite circular connector seal 1a and second composite circular connector seal 1b. These two composite circular connector seals 1 are as described above.

Figure 5:
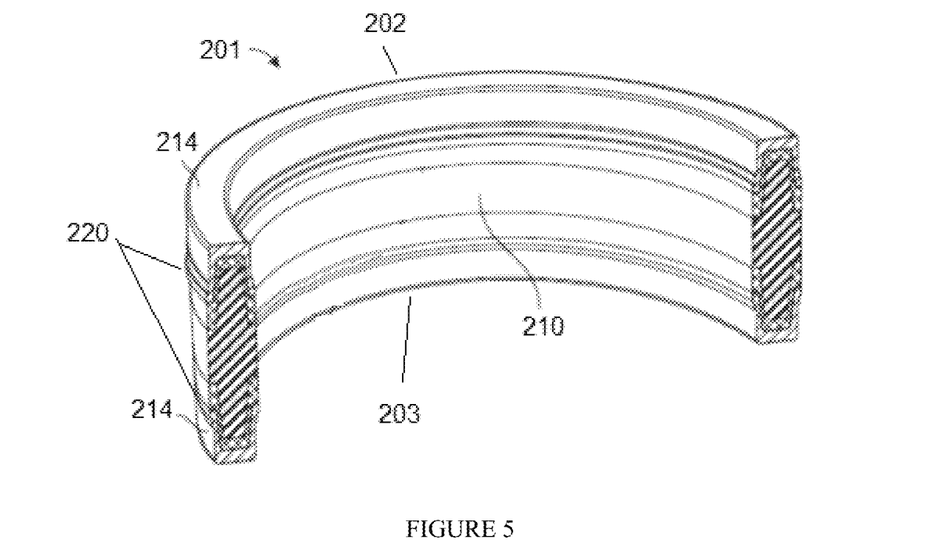
FIG. 5 is a cutaway view in partial perspective of an exemplary connector.
Figure 6:
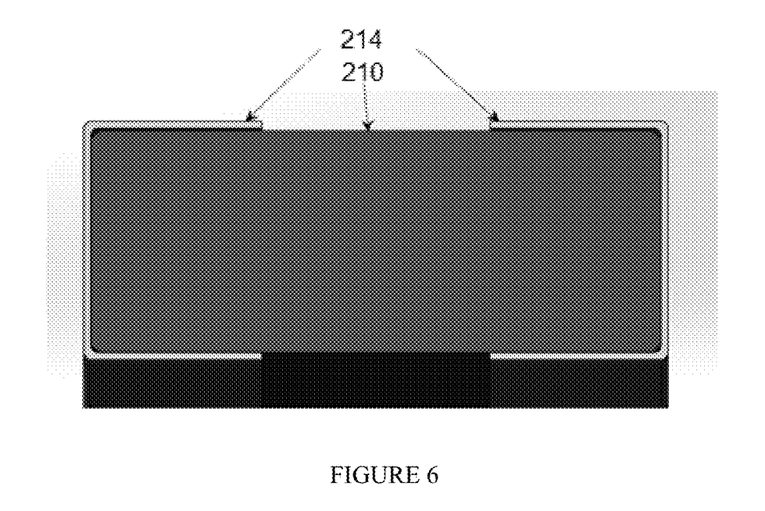
FIG. 6 is a cutaway view in partial perspective of a cross-section of the exemplary connector.

Referring now to FIGS. 5 and 6, in a further exemplary embodiment pipeline connector 200 comprises graphite packer 201; first side 202; second side 203 opposite first side 202; two flexible C-shaped rings 214, one per each of first side 202 and second side 203; and a set of slip limiting rings 220 placed on either side of graphite packer 201 against first C-shaped ring 214 and second C-shaped ring 214, typically adapted to aid mitigation against extrusion. First C-shaped ring 214 and second C-shaped ring 214 are also typically configured to inhibit graphite seal 210 from extruding out by being sufficiently flexible to flare out before graphite seal 210 is compressed into gap 204 between an inner diameter of graphite seal 210 and the outer diameter of tubular 100, thereby flaring out to meet the outer diameter of tubular 100. This further aids in containing graphite seal 210 about the outer diameter of tubular 100, such as to allow for effective capture of graphite seal 210 during connector set.

Graphite packer 201 comprises graphite seal 210 which comprises an inner diameter sized to fit about an outer diameter of tubular 100 (FIG. 7), e.g. slidingly fit. Graphite packer 201 may be configured in a single seal or dual seal configuration as needed.

Graphite seal 210 comprises a composition sufficient to flow under compression.

Each of first C-shaped ring 214 and second C-shaped ring 214 may comprise a metal, a Kevlar backing, or wire mesh graphite backing, or the like, or a combination thereof. As noted above, and referring additionally to FIG. 6, first flexible C-shaped ring 214 is disposed on first side 202 and second flexible C-shaped ring 214 is disposed on second side 203. Each of first flexible C-shaped ring 214 and second flexible C-shaped ring 214 is configured to operate as a primary extrusion mechanism for graphite seal 210. To mitigate extrusion of graphite seal, when graphite packer 201 is compressed, first and second C-shaped rings 214 flare out to meet the outer diameter of tubular 100 and to further contain graphite seal 210 along the outer diameter of tubular 100, typically at every point along the outer diameter of tubular 100, to keep graphite seal 210 from extruding out. First and second C-shaped rings 214 are flexible enough to flare out before graphite material in graphite seal 210 is compressed into gap 204 (FIG. 7) between and inner diameter of graphite seal 210 and the outer diameter of tubular 100, thereby aiding effective capture of graphite seal 210 during the setting of pipeline connector 200. As also noted above, slip limiting rings 220 are typically placed on either side of graphite packer 201 against C-shaped rings 214 to further mitigate against extrusion. These slip limiting rings 220 typically prevent C-shaped rings 214 as a primary extrusion mechanism from yielding or flaring out excessively to where graphite material is no longer contained, especially at larger sizes and higher pressure classes.

Figure 7:
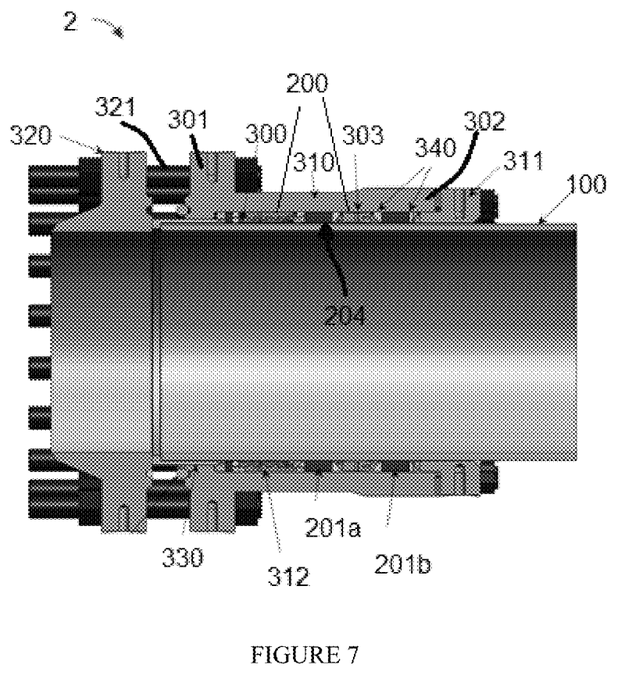
FIG. 7 is a cutaway view in partial perspective of the exemplary connector as part of an exemplary connecting system in a non-compressed state.
Figure 8:
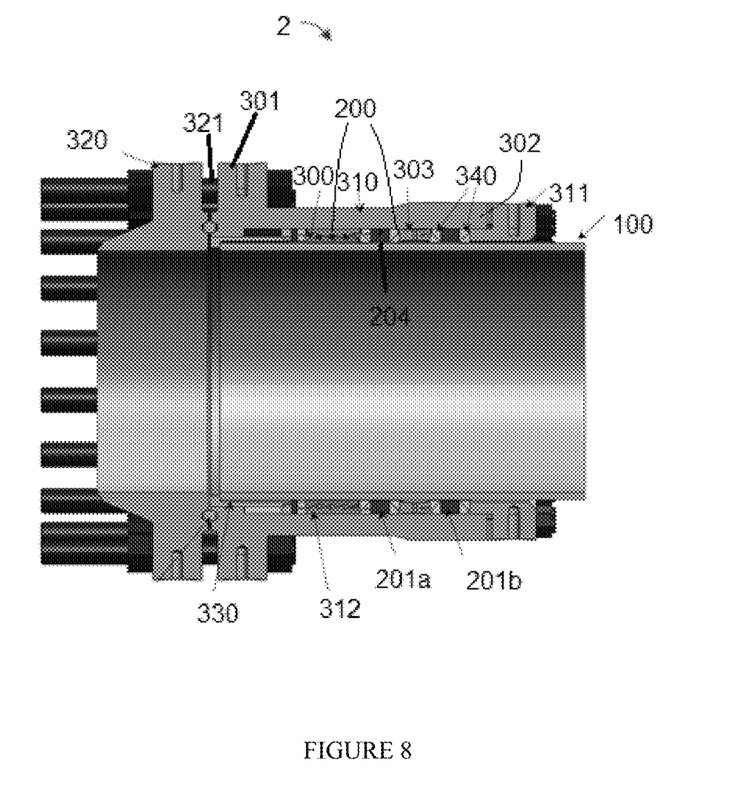
FIG. 8 is a cutaway view in partial perspective of the exemplary connector as part of an exemplary connecting system in a compressed state.

Referring now to FIGS. 7 and 8, tubular connection system 2 comprises slip 300, first pipeline repair connector 200 as described herein above sized to fit about an outer diameter of tubular 100 within tubular housing 310, and connector activator 330 operatively in communication with housing tubular 310 and operative to compress or decompress graphite packer 201.

Slip 300 typically comprises substantially tubular housing 310 sized to fit about an outer diameter of tubular 100. Tubular housing 310 comprises first end 301 and second end 302 and is typically sized to slidingly fit about the outer diameter of tubular 100.

In embodiments, one or more end caps 311 is disposed at second end 302 of tubular housing 310.

In embodiments, one or more grips 312 may be present and disposed within tubular housing 310 intermediate first end 301 first pipeline repair connector 200.

Connector activator 300 may comprise a piston. In these embodiments, the piston may comprise a hydraulically activated piston or a mechanically activated piston. In certain of these embodiments as well, connector activator 300 is operatively in communication with a single pipeline repair connector 200 although if other pipeline repair connectors 200 are present, as described below, connector activator 300 may be operatively in communication with one or more such pipeline repair connectors 200.

In certain embodiments, connector activator 330 further comprises flange 320 configured to fit at least partially about the outer diameter of tubular 100 and connector 321 disposed intermediate flange 320 and tubular housing 310. In these embodiments, connector actuator 330 is typically operatively in communication with flange 320 and operative to move flange 320 about the outer diameter of tubular 100.

In certain embodiments, tubular connection system 2 further comprises second pipeline repair connector 200 substantially similar to first pipeline repair connector 200 where second pipeline repair connector 200 is also disposed within tubular housing 310. In these embodiments, one or more annulus rings 303 may be present and disposed within tubular housing 310 intermediate first pipeline repair connector 200 and second pipeline repair connector 200.

In the operation of exemplary embodiments, referring back to FIG. 3, composite circular connector seals 1 and/or slip-on connector seal assembly 50 have the capacity to seal over a substantially complete range of outer diameter tolerances for such seals. By way of example and not limitation, in certain embodiments one or more slip-on connector seal assemblies 50 and/or composite circular connector seals 1 may be used as a slip-on riser end connector for an out-of-control riser blowout preventor BOP situation. In those embodiments, one or more slip-on connector seal assemblies 50 and/or composite circular connector seals 1 may be attached below a BOP capping stack and lowered onto a free-flowing riser in the event of an uncontrollable blowout condition. Once installed onto the free-flowing riser, these one or more slip-on connector seal assemblies 50 and/or composite circular connector seals 1 may then be mechanically attached and sealed to the outer diameter of the tubular.

Referring generally to FIGS. 3 and 4, one or more slip-on connector seal assemblies 50 and/or composite circular connector seals 1 is disposed over a tubular, conduit, casing, or the like such as tubular 100 and positioned in-between outside 101 of tubular 100 and inside 111 of housing 110. Tubular 100 may have one or more deflections, shown in FIG. 4 as bulge 102, as well as positive and negative outer diameter tolerance ranges. When pressure is applied, core seal element 10 is deformed to contact outside 101 of tubular 100 and inside 111 of housing 110 at seal contact region 103.

One or more slip-on connector seal assemblies 50 and/or composite circular connector seals 1 may be locked and sealed onto tubular 100 by maneuvering the one or more slip-on connector seal assemblies 50 and/or composite circular connector seals 1, as described above, to a predetermined position on tubular 100 where composite circular connector seal 1 is installed and configured to lock and seal over tubular 100.

Once installed onto tubular 100, one or more of positioned composite circular connector seals 1 are mechanically attached, locking onto tubular 100 and being sealed onto outer diameter 101 of tubular 100.

If two composite circular connector seals 1 are used, e.g. if one or more slip-on connector seal assemblies 50 is used, the second composite circular connector seal 1b (FIG. 3) may be maneuvered to a second predetermined position on tubular 100 proximate the first composite circular connector seal 1a (FIG. 2), either separately or as part of slip-on connector seal assembly 50, and a reduced test pressure applied between two composite circular connector seals 1a, 1b to validate that a positive seal has been obtained prior to applying a full maximum allowable operating pressure to tubular 100. Typically, as described above, two composite circular connector seals 1 are separated by metal ring 20.

If synthetic rubber and PEEK materials are used, a flow of both the synthetic rubber and PEEK materials may be allowed to move the inner diameter and outer diameter of packer cap 14 to the limit of seal gap 103, thus creating a near metal-to-metal seal on the front and back of the synthetic rubber/PEEK core of composite circular connector seal 1 to prevent extrusive flow of either the synthetic rubber or PEEK materials from either end of composite circular connector seal assembly 50 during full compressive load and operating pressure in tubular 100. Additionally, for such embodiments, each seal element 12 that is molded to the synthetic rubber may be used as the primary seal anti-extrusion mechanism such that as the synthetic rubber seal is compressed, the PEEK element moves into seal gap 103 to create a barrier to contain the synthetic rubber. As will thus be apparent to one of ordinary skill in the sealing arts, under longitudinal compressive load of the connector, core seal element 10 flows into seal gap 103 to create a positive seal and, typically, its volume remains constant but its shape is altered to match the volume fill.

Additionally, composite circular connector seal 1 may be used to create a positive seal on API 5CT casing across a range of minimum and maximum outer diameter tolerances. In certain embodiments composite circular connector seal 1 is used to create a positive seal load maintained on the casing equal to or greater than 1.2 times the maximum allowable operating pressure MAOP of tubular 100 which, as noted before, may be a vertical free-flowing casing.

In certain embodiments, core seal element 10 is allowed to flow into seal gap 103 to create a positive seal under longitudinal compressive load of composite circular connector seal 1. The volume of core seal element 10 may be maintained at a constant value and a shape of core seal element 10 may be altered to match the volume filled by core seal element 10 during sealing.

Referring now to FIGS. 7 and 8, pipeline connector 200 may be sealed about tubular 100 by maneuvering pipeline connector 200 to a position about tubular 100, where tubular 100 typically comprises a positive and negative outer diameter tolerance range. Maneuvering pipeline connector 200 typically comprises maneuvering pipeline connector 200 to a position intermediate an end of tubular 100 such as by sliding pipeline connector 200 along tubular 100.

In certain embodiments, two tubulars 100 are present where the end of first tubular 100 and the end of second tubular 100 are disposed proximate each other (not illustrated in the figures). In these embodiments, each tubular also typically comprises a positive and negative outer diameter tolerance range. In these embodiments, a second pipeline connector 200 may be present and maneuvering pipeline connector 200 typically comprises maneuvering first pipeline connector 200 to a position intermediate an end of a first tubular 100 and maneuvering second pipeline connector 200 to a position intermediate an end of second tubular 100 and first pipeline connector 200.

As described above, pipeline connector 200 is configured to lock and seal over tubular 100 and, if there are two tubulars 100, to lock and seal over an end of one tubular 100 or over ends of tubulars 100 which are proximate to or abutting each other. Connector activator 330 is used to compress pipeline connector 200 once pipeline connector 200 is placed in a desired position, thereby compressing graphite packer 201, such as by using connector actuator 330. During compression, first C-shaped ring 214 and second C-shaped ring 214 are allowed to operate as a primary extrusion mechanism for graphite seal 210 by allowing first C-shaped ring 214 and second C-shaped ring 214 to flare out before graphite seal 210 is compressed into gap 204 between an inner diameter of graphite seal 210 and the outer diameter of tubular 100 to meet the outer diameter of tubular 100 and to contain graphite seal 210 at a set of points, e.g. every point, along the outer diameter of tubular 100 from extruding out. Flared first C-shaped ring 214 and flared second C-shaped ring 214 are used to capture graphite seal 210 during connector set. The increased volume of graphite seal material generally accommodates being crushed over large gaps while covering and filling surface imperfections.

Slip limiting rings 220 may be present and typically used to further mitigate against extrusion by preventing first C-shaped ring 214 and second C-shaped ring 214 from yielding or flaring out excessively to where graphite seal 210 is no longer contained.

As described above, where two pipeline connectors 200 and their respective graphite packers 200 are present annulus ring 303 may be disposed within housing 301 intermediate first graphite packer 310 and second graphite packer 310.

The foregoing disclosure and description of the inventions are illustrative and explanatory. Various changes in the size, shape, and materials, as well as in the details of the illustrative construction and/or an illustrative method may be made without departing from the spirit of the invention.

We claim:
1. A pipeline connector, comprising:
 a. a graphite packer, comprising:
  i. a first side;
  ii. a second side disposed opposite the first side;
  iii. a first flexible C-shaped ring disposed on the first side;
  iv. a second flexible C-shaped ring disposed on the second side; and
  v. a graphite seal disposed intermediate the first flexible C-shaped ring and the second flexible C-shaped ring, the graphite seal comprising an inner diameter sized to slidingly fit about an outer diameter of a tubular and a graphite-based composition sufficient to flow under compression, the first flexible C-shaped ring and the second flexible C-shaped ring configured to operate as a primary extrusion mechanism for the graphite seal; and
 b. a set of slip limiting rings disposed on either the first side or the second side of the graphite packer against the first C-shaped ring or the second C-shaped ring.
2. The pipeline connector of claim 1, wherein the first C-shaped ring and the second C-shaped ring comprise a metal, a Kevlar backing, or a wire mesh graphite backing.
3. The pipeline connector of claim 1, wherein the first C-shaped ring and the second C-shaped ring are configured to inhibit the graphite seal from extruding out by comprising a flexibility sufficient to flare out to meet the outer diameter of the tubular before the graphite seal is compressed into a gap between an inner diameter of the graphite seal and the outer diameter of the tubular and to contain the graphite seal about the outer diameter of the tubular.
4. The pipeline connector of claim 3, wherein the set of slip limiting rings are configured to prevent the first C-shaped ring and the second C-shaped ring from yielding or flaring out excessively to where the graphite seal is no longer contained.
5. A tubular connection system, comprising:
 a. a slip, comprising a substantially tubular housing sized to fit about an outer diameter of a tubular, the tubular housing comprising a first end and second end;
 b. a first pipeline connector sized to fit within the tubular housing, comprising:
  i. a graphite packer, comprising:
   1. a first side;
   2. a second side disposed opposite the first side;
   3. a first flexible C-shaped ring disposed on the first side;
   4. a second flexible C-shaped ring disposed on the second side; and
   5. a graphite seal disposed intermediate the first flexible C-shaped ring and the second flexible C-shaped ring, the graphite seal comprising an inner diameter sized to slidingly fit about an outer diameter of a tubular and a graphite-based composition sufficient to flow under compression, the first flexible C-shaped ring and the second flexible C-shaped ring configured to operate as a primary extrusion mechanism for the graphite seal; and
  ii. a set of slip limiting rings disposed on either the first side or the second side of the graphite packer against the first C-shaped ring or the second C-shaped ring; and
 c. a connector activator operatively in communication with the tubular housing and operative to compress or decompress the graphite packer.
6. The tubular connection system of claim 5, further comprising an end cap disposed at the second end of the tubular housing.
7. The tubular connection system of claim 5, further comprising:
 a. a second pipeline connector identically shaped to the first pipeline connector, the second pipeline connector disposed within the tubular housing proximate the first pipeline connector; and
 b. an annulus ring disposed within the tubular housing about the tubular intermediate the first pipeline connector and the second pipeline connector.
8. The tubular connection system of claim 5, wherein the tubular housing is sized to slidingly fit about the outer diameter of the tubular.
9. The tubular connection system of claim 5, further comprising a grip disposed within the tubular housing about the tubular intermediate the first end of the housing and the graphite packer.
10. The pipeline repair connector of claim 5, wherein the connector activator comprises a piston.
11. The pipeline repair connector of claim 10, wherein the piston comprises a hydraulically activated piston or a mechanically activated piston.
12. The pipeline repair connector of claim 5, wherein the connector activator is operatively in communication with a single pipeline repair connector.
13. The pipeline repair connector of claim 5, wherein the connector activator is operatively in communication with a plurality of pipeline repair connectors.

14. The tubular connection system of claim 5, wherein the connector activator further comprises:
   a. a flange configured to fit at least partially about the outer diameter of the tubular; and
   b. a connector disposed intermediate the flange and the tubular housing, the connector actuator operatively in communication with the flange and operative to move the flange about the outer diameter of the tubular.

15. A method of sealing a connector using a tubular connection system, the tubular connection system comprising:
   a slip which comprises a substantially tubular housing sized to fit about an outer diameter of a tubular, the tubular housing comprising a first end and second end;
   a first pipeline connector disposed within the tubular housing, the first pipeline connector comprising a graphite packer comprising:
      a first side,
      a second side disposed opposite the first side,
      a first flexible C-shaped ring disposed on the first side,
      a second flexible C-shaped ring disposed on the second side, and
      a graphite seal disposed intermediate the first flexible C-shaped ring and the second flexible C-shaped ring, wherein the graphite seal comprises:
         an inner diameter sized to slidingly fit about an outer diameter of the tubular and
         a graphite-based composition sufficient to flow under compression and wherein the first flexible C-shaped ring and the second flexible C-shaped ring are configured to operate as a primary extrusion mechanism for the graphite seal;
   a set of slip limiting rings, a first slip limiting ring of the set of slip limiting rings disposed on the first side of the graphite packer against the first C-shaped ring and a second slip limiting ring of the set of slip limiting rings disposed on the second side of the graphite packer against the second C-shaped ring; and
   a connector activator operatively in communication with the tubular housing and operative to compress or decompress the first graphite packer, the method comprising:
      a. maneuvering the tubular connection system to a position about the outer diameter of the tubular, the tubular comprising a positive and negative outer diameter tolerance range;
      b. using the connector activator to compress the first pipeline connector, thereby compressing the graphite packer;
      c. during compression, allowing the first C-shaped ring and the second C-shaped ring to operate as the primary extrusion mechanism for the graphite seal by allowing the first C-shaped ring and the second C-shaped ring to flare out before the graphite seal is compressed into a gap between an inner diameter of the graphite seal and the outer diameter of the tubular to meet the outer diameter of the tubular and to contain the graphite seal along the outer diameter of the tubular, thereby preventing the graphite seal from leaking out;
      d. using the flared first C-shaped ring and the second C-shaped ring to capture the graphite seal during setting of the first pipeline connector; and
      e. using the slip limiting rings to mitigate against extrusion by preventing the first C-shaped ring and the second C-shaped ring from yielding or flaring out excessively to where the graphite seal is no longer contained.

16. The method of sealing a connector of claim 15, wherein a volume of graphite-based composition increases to accommodate being crushed over large gaps while covering and filling surface imperfections.

17. The method of sealing a connector of claim 15, wherein
   a. the tubular comprises a first tubular and a separate second tubular; and
   b. maneuvering the tubular connection system to the position about the tubular comprises maneuvering the first pipeline connector to a position intermediate an end of the first tubular and an end of the second tubular, the end of the first tubular and the end of the second tubular disposed proximate each other, each of the first and the second tubulars comprising a positive and negative outer diameter tolerance range, the first pipeline connector further configured to lock and seal over the ends of the first and the second tubulars.

18. The method of sealing a connector of claim 15, wherein:
   a. the tubular comprises a first tubular and a separate second tubular;
   b. the tubular connection system comprises a second pipeline connector disposed within the tubular housing; and
   c. maneuvering the tubular connection system to the position about an outer diameter of the tubular comprises maneuvering the tubular connection system such that the first pipeline connector is in a position proximate an end of the first tubular and the second pipeline connector is in a position about the second tubular intermediate the first pipeline connector and a location proximate an end of the second tubular, the end of the first tubular and the end of the second tubular disposed proximate each other, each of the first tubular and the second tubular comprising a positive and negative outer diameter tolerance range, each of the first pipeline connector and the second pipeline connection further configured to lock and seal over an end of the first tubular or the second tubular.

* * * * *